No. 656,865. Patented Aug. 28, 1900.
A. TOBLER & H. SAMUEL.
ELASTIC TIRE FOR WHEELS.
(Application filed May 8, 1900.)

(No Model.) 2 Sheets—Sheet 1.

Witnesses:
C. Holloway
H. C. Pinkney

Inventors:
Alfred Tobler
Henri Samuel,
By J. E. M. Bowen
Attorney

THE NORRIS PETERS CO., PHOTO-LITHO., WASHINGTON, D. C.

No. 656,865. Patented Aug. 28, 1900.
A. TOBLER & H. SAMUEL.
ELASTIC TIRE FOR WHEELS.
(Application filed May 8, 1900.)
(No Model.) 2 Sheets—Sheet 2.
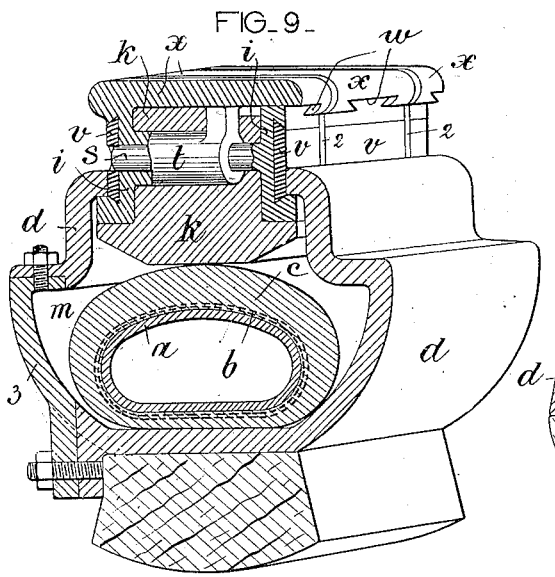
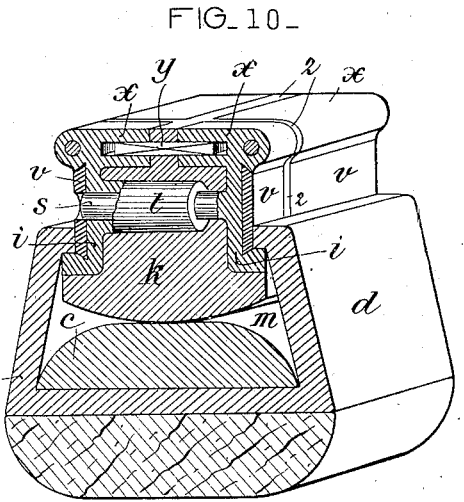
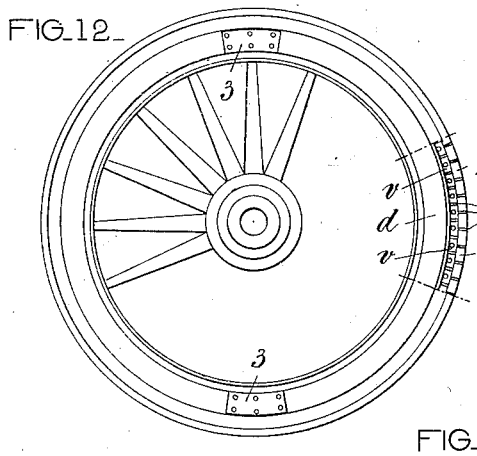
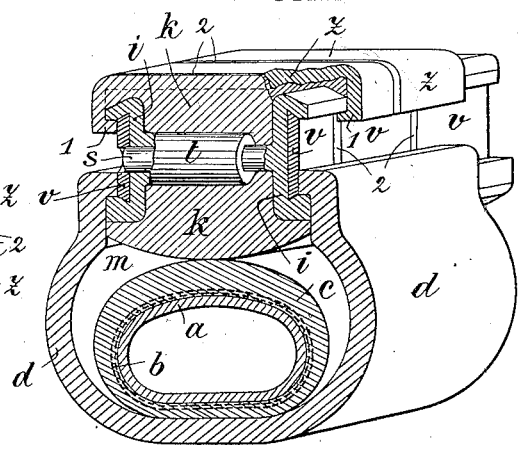
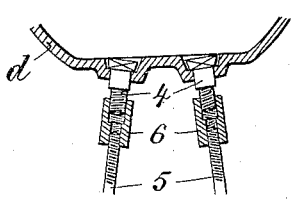
Witnesses:
C. Holloway
H. C. Pinckney
Inventors
Alfred Tobler
Henri Samuel
By J. E. M. Bowen
Attorney

UNITED STATES PATENT OFFICE.

ALFRED TOBLER AND HENRI SAMUEL, OF PARIS, FRANCE.

ELASTIC TIRE FOR WHEELS.

SPECIFICATION forming part of Letters Patent No. 656,865, dated August 28, 1900.

Application filed May 8, 1900. Serial No. 15,885. (No model.)

*To all whom it may concern:*

Be it known that we, ALFRED TOBLER and HENRI SAMUEL, engineers, residing at 12 Rue de la Bourse, Paris, in the Republic of France, have invented certain new and useful Improvements in Elastic Coverings or Tires Having an Inner Pneumatic Device for the Rims of Wheels, of which the following is a specification.

Our invention relates to a new system of elastic covering for the pneumatic tires of motor-cycle, motor-car, and other vehicle wheels, and of which the particular arrangements have for their object to obtain perfect security against the puncture of the inner pneumatic tube and also a very supple radial tread for the pneumatic tire.

In order that our invention may be easily and fully understood, we will refer to the accompanying drawings, in which we have shown several desired forms of our new elastic covering.

Figure 1:
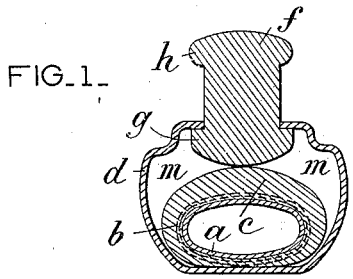
Figure 2:
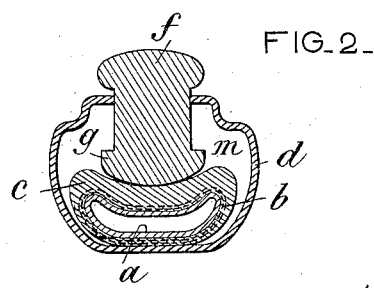
Figure 3:
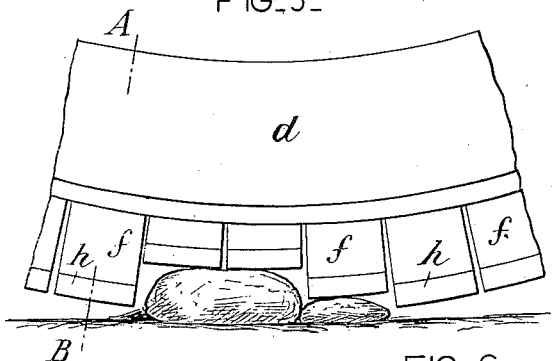
Figure 4:
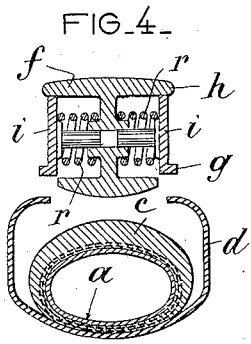
Figure 5:
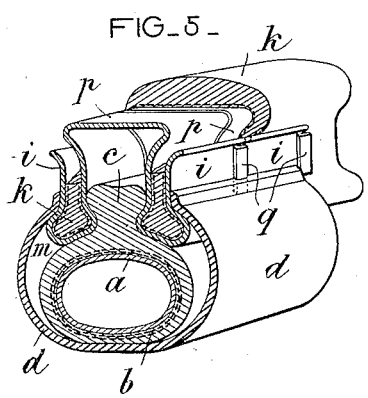
Figure 6:
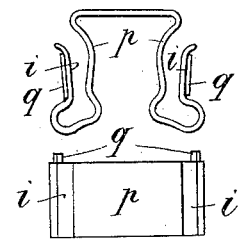
Figure 8:
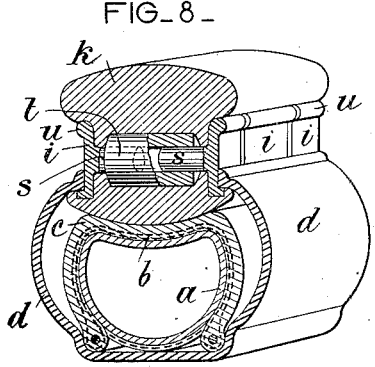
Figure 7:
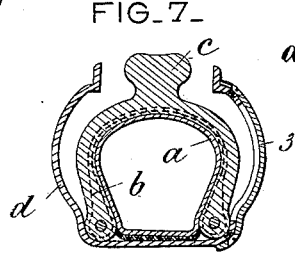

Figure 1 is a diagrammatic view of the said covering. Fig. 2 shows the distorted form taken by the inner pneumatic tube when the tread of the covering is moved radially. Fig. 3 shows how the sections of the tread part of the covering are able to move one relatively to another when passing over an obstacle. Fig. 4 shows another form of our invention in which the elastic covering is provided with movable rigid cheeks held apart by the tension of springs. Fig. 5 is a transversal section of our covering intended for motor-cycles and other light-weight vehicles. Fig. 6 is a detail of a piece provided with sliding cheeks and which is separate from the remainder of the covering. Fig. 7 represents another form of our invention. Fig. 8 shows in transversal section our covering when intended for cars. Fig. 9 shows a covering for heavy-weight vehicles. Fig. 10 shows a modified form of covering for heavy-weight vehicles, the rubber being full within the rim. Fig. 11 represents another form of covering having an inner pneumatic tube and provided with a metal tread. Fig. 12 shows the arrangement of doored openings in the hollow tire for the insertion of the air-chamber. Fig. 13 shows one way in which the metal spokes can be fixed to wheels provided with our system of coverings.

The pneumatic-tube covering for motor-cycles, motor-cars, and other light or heavy weight vehicles, which forms the object of our invention, comprises, as shown in Fig. 1, the following essential features:

First. A hollow rim or tire $d$ of any form, whether trapezoidal or rectangular, cylindrical or elliptic, having straight or curved walls and provided with an opening having insets intended for holding the heels $g$, with which the covering is provided.

Second. A flexible tread part $f$, capable of sliding radially in the opening in the hollow rim and provided with heels $g$ to prevent the said flexible tread from working out of the said rim and also with flanges $h$ to limit its radial movement.

Third. A complete pneumatic part—that is to say, a rubber air-chamber $a$—which can be inflated to a suitable pressure in a limited space, the said air-chamber being held by a canvas covering or facing $b$ capable of changing its form but sufficiently wanting in elasticity to be able to resist the pressure from within. A rubber cope $c$ protects the canvas facing from wear through friction with the adjacent parts. The said pneumatic part, whether having rods or heels or in the form of a simple tube, is placed within the hollow tire $d$. The flexible tread part bears on the said cope $c$, and consequently on the outer side of the pneumatic part, and the latter may be sufficiently inflated to hold the said tread part $f$ in the position shown in Fig. 1, so that the heels $g$ bear against the insets or flanges of the opening in the tire $d$.

The pneumatic part shown in Fig. 1 is in the form of a simple tube capable of tightening down circumferentially of the tire under increased pressure. If the inner pneumatic part is provided with rods, as shown in Figs. 7 and 8, or with heels, the said rods or the said heels hold it uniformly down at the bottom of the tire.

As the inner space of the hollow tire is greater than that of the pneumatic part when the latter is inflated to its full extent, the said pneumatic part leaves empty spaces $m$ within the tire. When the tread part, moved radially inward, comes and compresses the pneumatic part, the latter changes its shape, as shown in Fig. 2, in the same manner as that of an ordinary bicycle. As the pneumatic part is held by its inextensible canvas facing, it cannot become pinched by the heels $g$, as might occur were the air-chamber used alone; but when provided with the said canvas facing it simply bulges out laterally, with its lateral part liable at times to come and bear against the inner walls of the tire or rim $d$.

According to the use to which our pneumatic tire is to be put we construct the tread part in different ways. For motor-cycles, three-wheel motor-cars, and other light vehicles it consists of a canvas-faced rubber cope, Fig. 5, provided with a light metal mounting. For heavier-weight vehicles the said tread part is formed by a series of sliding metal or other rigid parts, Fig. 8, embedded in a thick band of molten rubber. For very heavy vehicles the tread part is almost exclusively composed of a series of strong metal pieces, Figs. 9 to 11, connected together by means of a slightly-flexible and sufficiently-resisting substance, such as a mixture of rubber and hemp, something like linoleum; but whatever may be the composition of our pneumatic tire or rim and for whatever use it may be intended the said tread part is characterized by the features we will now describe in referring to Figs. 1 to 4 and 5 to 11, which represent several forms of the same. The said tread part comprises a series of pieces independent of each other, but which may be connected together by one or several pieces of changeable shape and allowing the said independent pieces to move radially one relatively to another and each piece separately, as shown in Fig. 3. Fig. 4 is a section on the line A B of Fig. 3 of one of the said pieces before its insertion in the tire. The cheeks $i$, suitably guided, so as to remain constantly parallel the one to the other, are capable of moving toward or away from each other, and subjected to the action of the springs $r$ which act to keep the distance between the two outer faces greater than the with of the opening in the tire $d$. The said cheeks $i$ are provided with heels $g$. They coöperate in pairs with the corresponding parts of the tread part or band and are consequently carried by the said corresponding parts, which they guide in their radial movements.

To insert the covering in the rim $d$, pressure is successively put on the outer faces of the cheeks $i$, such pressure being rendered sufficient to so reduce the distance between the heels $g$ as to allow of their being passed through the opening in the said rim $d$. This part of the elastic covering or tire being in place and the pressure on the cheeks $i$ having ceased, the springs $r$ force the said cheeks against the inner edges of the opening in the rim $d$. We thus obtain detached pieces forming the tread part or band and which are safely held in the rim by the heels $g$ and which are capable of radial movement either together or separately. They are maintained in their normal position with respect to the rim $d$ by the pressure of the cheeks $i$ against the walls of the opening of the rim. The said pressure also takes up the wear resulting from the friction between the parts.

The elasticity of the whole covering or tire is secured by the pressure of the inner pneumatic tube against the tread part or band and by the ease with which the latter can slide radially between the edges of the rim $d$. When the said inner pressure ceases, the tread part or band moves down completely into the rim, and the edges of the latter serve to support the flanges $h$, which now constitute the tread band or circle, the degree of suppleness of which depends on the matter or substance of which it is made. The diameter of the circumference of the tread band or circle then becomes reduced. That is why we arrange the several pieces of the tread part in such a manner as to be able to come nearer together when the circle becomes narrowed. (See Fig. 3.)

Instead of forming the tread part or band by means of pieces entirely composed of metal, as shown in Fig. 4, we prefer using the elasticity of rubber or of a rubber-containing substance to obtain the proper coöperation of the cheeks with the other metal pieces and also the pressure of the cheeks against the edges of the hollow rim $d$.

In Fig. 5 the cheeks $i$ are shown as being formed two by two integral with a metal mounting, the initial form of which is shown in Fig. 6. The edges of the continuous rubber coping or casing $k$, which covers the whole of the said pieces, are inclosed between the cheeks $i$ and the body of the mountings $p$. The latter are yielding, their sides being pressed inward when inserted in the rim $d$, after which they spring out, so as to give rise to a suitable pressure between the cheeks $i$ and the edges of the rim. For the purpose of guiding the adjacent mountings $p$ and causing them to bear one against another, so as to make them move together only to a certain extent, a flange $q$ may be formed at one end of each cheek, so as to overlap the edge or end of the adjacent cheek. The said flanges run in guide ways formed in the edges of the rim $d$.

In the tread part or band shown in Fig. 8 the cheeks $i$ are independent and held parallel to each other by means of pins $s$, integral with the cheeks of each pair and engaged in a common socket $t$, in which they are able to slide without having any transversal play. The said sockets $t$ and also the pins $s$ are embedded in a continuous rubber circle preferably provided with flanges $h$, overhanging the flanges $u$ of the cheeks $i$, so as to constitute a tread part or band which still remains elastic when the inner pneumatic tube is no longer inflated.

The cheeks $i$ may be made of bronze or steel and faced with bronze or other soft-metal plates V set in the cheeks, as shown in Figs. 9 to 11.

In order to form around the continuous rubber circle $k$ a metal protection against wear, we may use different arrangements, of which three are shown in Figs. 9 to 11. In Fig. 9 the said protective means is formed by heels or soles $x$, integral with one of the cheeks $i$ of each pair of cheeks. A dovetailed groove $w$ may be provided in each of the said heels or soles $x$ to connect them to the opposite cheeks $i$ in such a manner as to allow them to slide. Fig. 10 shows another arrangement, in which the said heels or soles are formed on both cheeks $i$ of each pair and are guided or kept in alinement with each other by means of a rod $y$, inserted in mortises made in each of themselves. The protective means against wear may also be formed by metal copings or casings $z$, Fig. 11, having inner flanges 1 engaging with the outer flanges $h$ of the cheeks $i$. The said casings $z$ cover the continuous rubber circle $k$, in which are embedded the sockets $t$ and the pins $s$, serving to connect the cheeks $i$ together. We prefer to so place the copings $z$ and the cheeks $i$ that their separation alternate with each other, as may be seen by a part of the wheel shown in Fig. 12. The said parts may be held in their respective positions by ribs 2, integral with the rubber circle $k$ and filling up the intervals existing, on the one hand, between the copings $z$ and, on the other hand, between the cheeks $i$.

To render easy the mounting of the elastic covering or tire, we might form the hollow rim $d$ in two annular parts juxtaposed and joined together by screws or bolts; but in order not to impair the solidity of the said rim we prefer to make the same in one piece and to provide two or more doored entries 3, Fig. 11, through which it is easy to insert a pneumatic tube or air-chamber, having its two ends terminating in a point and provided with strings to draw the two ends together, according to an arrangement already known. In this case the rods or the casing of the pneumatic tube are not continuous and provided with means—such as nuts, laces, or the like—allowing to stretch the same after the insertion of the pneumatic in the rim $d$.

For the purpose of facilitating the replacing of the metal spokes which in certain cases will be used to connect the rim with the hub of the wheel we embed in the rubber rim $d$, Fig. 13, screws 4, unable to turn and on which the metal spokes 5 may be fixed by means of sleeves 6, one part of which is screw-threaded to the left and the other part to the right. This arrangement avoids the necessity of removing the pneumatic tube from the rim each time it is required to replace a spoke.

We wish it to be understood that the forms and dimensions of the several above-described constitutive parts of our elastic coverings or tires, which parts are also shown in the drawings, may be modified according to requirements, the use for which the same are intended, and the nature of the loads they will have to support or carry.

We claim—

1. An elastic covering or tire having an inner pneumatic device, comprising an inner pneumatic device complete, with air-chamber, a fabric covering or facing, and a rubber coping or casing, arranged within a hollow rim, in the opening in which are able to slide in a radial direction a series of pieces or parts forming a tread part or band, which pieces or parts are provided with plane parallel cheeks, pressed laterally outward, and having heels or flanges preventing the same from being torn out of the rim, and having also outer flanges, the said pneumatic device having an outer cross-section, when inflated, smaller than the inner cross-section of the said rim, substantially as described.

2. An elastic covering or tire having an inner pneumatic device, comprising a hollow rim, a pneumatic device complete, with air-chamber, a fabric covering or facing, and a rubber coping or casing, arranged within the said rim, and a tread part or band formed by a series of cheeks connected together, in pairs, by means of pins and guide-sockets by a continuous rubber circle in which are embedded the said pins and sockets, and by metal soles covering the periphery of the rubber circle, substantially as described.

3. An elastic covering or tire having an inner pneumatic system or device, comprising a hollow rim, a pneumatic device complete, with air-chamber, a fabric covering or facing, and a rubber coping or casing, arranged within the said rim, with empty spaces remaining between the said pneumatic device and the walls of the rim, a continuous rubber band, sockets embedded in the said band, rigid cheeks provided with pins engaged in the said sockets, and with inner flanges engaging under the edges of the rim, and metal soles covering the periphery of the rubber band, substantially as described.

4. An elastic covering or tire having an inner pneumatic device, comprising a hollow rim having one or more lateral doored openings, a pneumatic device complete, with air-chamber, a fabric covering or facing, and a rubber coping or casing, arranged within the said rim, and a tread-band formed by a rubber circle and by cheeks held parallel two by two by guide-sockets and pins, the said cheeks being able to slide in a radial direction between the edges of the said rim, substantially as described.

In testimony that we claim the foregoing as our invention we have signed our names in presence of two subscribing witnesses.

ALFRED TOBLER.
HENRI SAMUEL.

Witnesses:
EDMOND E. LÉTUE,
EUGENE WATTIER.